(12) United States Patent
Jang et al.

(10) Patent No.: US 7,468,417 B2
(45) Date of Patent: Dec. 23, 2008

(54) METHOD OF PREPARING CYCLIC OLEFIN COPOLYMER HAVING CONTROLLED GEL CONTENTS

(75) Inventors: Youngchan Jang, Daejeon (KR); Hyun-Kyung Sung, Daejeon (KR); Han Jin Kwag, Daejeon (KR)

(73) Assignee: Korea Kumho Petrochemical Co., Ltd., Seoul (KR)

( * ) Notice: Subject to any disclaimer, the term of this patent is extended or adjusted under 35 U.S.C. 154(b) by 149 days.

(21) Appl. No.: 11/467,100

(22) Filed: Aug. 24, 2006

(65) Prior Publication Data

US 2007/0060730 A1    Mar. 15, 2007

(30) Foreign Application Priority Data

Aug. 26, 2005    (KR) .................. 10-2005-0078864

(51) Int. Cl.
*C08G 61/08*    (2006.01)
*C08F 2/38*    (2006.01)
*C08F 4/78*    (2006.01)

(52) U.S. Cl. .................. 526/169; 526/161; 526/281; 526/283

(58) Field of Classification Search .................. 526/161, 526/169, 281, 283
See application file for complete search history.

(56) References Cited

U.S. PATENT DOCUMENTS

| | | | | |
|---|---|---|---|---|
| 3,997,471 | A | 12/1976 | Ofstead .................. 252/429 B |
| 4,002,815 | A | 1/1977 | Minchak .................. 526/283 |
| 4,060,468 | A | 11/1977 | Castner .................. 204/158 R |
| 4,069,376 | A | 1/1978 | Minchak .................. 526/137 |
| 4,138,448 | A * | 2/1979 | Minchak .................. 525/247 |
| 4,400,340 | A | 8/1983 | Klosiewicz .................. 264/328.6 |
| 4,810,762 | A | 3/1989 | Sjardijn et al. .................. 526/166 |
| 4,882,401 | A | 11/1989 | Bell .................. 526/119 |
| 5,019,620 | A * | 5/1991 | Endo et al. .................. 524/485 |
| 5,081,208 | A | 1/1992 | Sjardijn .................. 526/166 |
| 5,840,820 | A | 11/1998 | DeSimone et al. .................. 526/169 |
| 5,939,504 | A | 8/1999 | Woodson, Jr. et al. .................. 526/145 |
| 6,020,443 | A | 2/2000 | Woodson et al. .................. 526/135 |
| 6,433,113 | B1 | 8/2002 | Mukerjee et al. .................. 526/160 |
| 6,511,756 | B1 | 1/2003 | Obuchi et al. .................. 428/517 |

* cited by examiner

*Primary Examiner*—Fred M Teskin
(74) *Attorney, Agent, or Firm*—Occhiuti Rohlicek & Tsao LLP

(57) ABSTRACT

The present invention relates to a method of preparing a copolymer having controlled gel content by polymerizing cyclic olefin compound by ROMP (Ring Opening Metathesis Polymerization), and more precisely, a method of preparing cyclic olefin copolymer with high yield, in which a complex prepared by mixing a W salt compound and an organoaluminum halide compound is used as a catalyst in the presence or absence of a molecular weight regulator, and a method of controlling gel formation by regulating the composition of cyclic olefin monomer composing a copolymer as shown in the following Empirical Formula 1 without using a reaction speed regulator or gel formation inhibitor.

(Empirical Formula 1)
Norbornene=30~70 weight %
Cyclic olefin compound=70~30 weight %

At this time, the cyclic olefin compound presented in the above Empirical Formula 1 is one or more compounds selected from a group consisting of dicyclopentadiene and compounds represented by the following Formula 1.

(Formula 1)

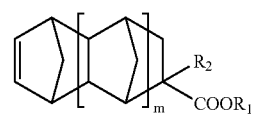

Wherein, m is an integer of 0-1, $R_1$ is $C_1$-$C_5$ alkyl and $R_2$ is H or $C_1$-$C_{10}$ alkyl.

12 Claims, No Drawings

METHOD OF PREPARING CYCLIC OLEFIN COPOLYMER HAVING CONTROLLED GEL CONTENTS

TECHNICAL FIELD

The present invention relates to a method of preparing a copolymer of cyclic olefin compound, and more precisely, a method of preparing cyclic olefin copolymer with high yield, in which a complex prepared by mixing a W salt compound and an organoaluminum halide compound is used as a catalyst in the presence or absence of a molecular weight regulator, and a method of controlling gel formation by regulating the composition of cyclic olefin monomers composing a copolymer as shown in the following Empirical Formula 1 without using a reaction speed regulator or gel formation inhibitor.

(Empirical Formula 1)
Norbornene=30~70 weight %
Cyclic olefin compound=70~30 weight %

At this time, the cyclic olefin compound presented in the above Empirical Formula 1 is one or more compounds selected from a group consisting of dicyclopentadiene and compounds represented by the following Formula 1.

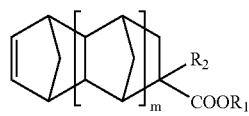

(Formula 1)

Wherein, m is an integer of 0-1, $R_1$ is $C_1$-$C_5$ alkyl and $R_2$ is H or $C_1$-$C_{10}$ alkyl.

BACKGROUND ART

In general, while cyclic olefin copolymer is being prepared, gel formation is observed during or after the reaction.

The gel formed thereby increases the solution viscosity of a polymer and might inhibit the flow of a reactant or a reaction product by being accumulated on the wall or pipe line of a reactor, causing a serious problem during commercial processes. Also the solubility of a polymer containing the gel at more than the allowable amount decreases in an organic solvent, and processing performance of the polymer might be reduced because it cannot be melted evenly by heat. In the case when a polymer contains the gel at more than the allowable amount after polymerization, the efficiency of the following hydrogenation drops significantly, and thus the double bonds remaining in the polymer chain are degraded by foreign factors such as UV and heat, thereby degrading the properties of a product. Therefore, the formation of gel is a crucial problematic factor for cyclic olefin copolymer production by ROMP.

Copolymer of ethylene, propylene and cyclic olefin compound can have excellent properties, particularly transparency and thermal resistance, which is something that the conventional polyethylene or polypropylene cannot provide, with the insertion of an integrate cyclic structure in the backbone of the copolymer. Thus, cyclic olefin polymer or copolymer, as an optical material having excellent transparency and low-hygroscopy, can be used in various fields including DVDs, CDs, lenses and optical fiber etc, instead of polycarbonate (PC) or polymethylmethacrylate (PMMA) resin which have been used as information recording materials.

Recently, various norbornene derivatives having alkyl and polar functional groups have been used for the production of cyclic olefin polymer, and such norbornene derivatives can be applied not only to the production of copolymers but also to the production of single polymers.

Some of the advanced cyclic olefin copolymer manufacturing companies are underway with the development of the advanced next generation materials having super properties, particularly excellent thermal-, mechanical-, and optical properties, which is the ultimate goal that the conventional polyolefin cannot reach, by copolymerization of ethylene and styrene, cyclic olefin and methylmethacrylate. Especially, the copolymer produced by the copolymerization of cyclic olefin compound and ethylene has excellent optical and thermal properties, making the copolymer an excellent candidate for the next generation material for information recording such as CD and DVD.

Norbornene polymer can not only replace polycarbonate but also reduce the gap between CD tracks, suggesting that it enables high integration so as to be used for the next generation DVD (HD-DVD). In addition, the polymer has a great potential in the application of lenses for camcorders or autocameras, etc. owing to its excellent optical properties, dimensional stability, moisture resistance and low density.

Polymerization catalysts used for the production of a polymer using cyclic olefin compound are largely divided as follows; ROMP (Ring Opening Metathesis Polymerization) catalysts; addition polymerization catalysts; cationic catalysts; and radical initiators.

ROMP catalysts, addition polymerization catalysts and cationic catalysts can be commonly used for the production of cyclic olefin copolymer having excellent transparency. In the case of using ROMP catalysts, it is required to saturate the double bond of the polymerized polymer by hydrogenation, which is a disadvantage, but it is superior to other catalysts in the polymerization of monomers harboring hetero atoms. In the case of using addition polymerization catalysts, it is possible to produce the final polymer product right after the polymerization, but it has a low rate of polymerization of monomers harboring hetero atoms.

Major metal components of ROMP catalyst are Mo, W, Ru and Re, and the activity of the catalyst can be regulated by modifying the ligand arranged near the metals or applying different cocatalysts and additives.

Major metal components composing addition polymerization catalyst are Ti, Zr, Cr, Co, Ni and Pd. Among these metals, Ni and Pd are the most representative metal catalysts used for the production of cyclic olefin copolymer.

The advantages of the cyclic olefin copolymer are low density, high transparency, low hygroscopy and heat-resistance, which enable the replacement of the conventional glass, acrylic polymer, polycarbonate and polyvinylidene chloride (PVDC).

U.S. Pat. Nos. 4,002,815 and 4,069,376 describe a method to regulate the amount of gel produced during ROMP of cyclic olefin compound, in which non-cyclic non-conjugated olefin compound, having a least one hydrogen atom on each double-bonded carbon atom, were mixed with W salt compound and a complex prepared by mixing $AlR_2I$, $AlRI_2$ or $AlR_3$ and $I_2$ was used as a polymerization catalyst to control gel production during the polymerization. However, the polymerization yield was comparatively low (less than 70%) in the former and the polymerization yield was between 6-100% in the latter, indicating that the polymerization activity varies with the polymerization conditions.

U.S. Pat. Nos. 6,020,443 and 5,939,504 describe another method to regulate gel production by regulating the polymerization reaction speed using Lewis base compound, in which such compounds as phosphine, phosphite, ether, amine, amide sulfoxide, nitrile or furan were used. However, using a reaction speed regulator makes the reaction processes more complicated and might reduce the polymerization yield in some cases.

In the meantime, U.S. Pat. No. 4,400,340 describes a method of preparing cyclic olefin copolymer using RIM (Reaction Injection Molding Process). According to the description, cylcic olefin copolymer is produced using a complex prepared by adding ether, ester, or keytone compound, as a reaction speed regulator, to the mixture of W salt compound and dialkylaluminum halide or alkylaluminum dihalide compound. Similarly, U.S. Pat. No. 4,882,401 describes a method of preparing cyclic olefin copolymer by using a complex prepared by adding ether, phosphine, or phosphite compound as a reaction speed regulator and dialkylzinc or alkylzinc halide compound as a catalyst activator to W salt compound or Mo salt compound. However, this method also has a problem of creating complicated processes resulting from the addition of a catalyst activator and a reaction speed regulator.

U.S. Pat. No. 3,997,471 describes a method of preparing cyclic polymer, in which a complex prepared by adding an alcohol compound harboring a nitrile group or a halogen element, as a reaction speed regulator, to the mixture of W salt compound and dialkylaluminum halide is used as a catalyst. However, the polymerization yield according to this method is less than 80%. Similarly, U.S. Pat. No. 6,511,756 describes a method of preparing cyclic olefin polymer using a complex prepared by adding a compound harboring a nitrile group, ketone group, ether group or ester group, as a reaction speed regulator, to the mixture of W salt or Mo salt compound and an organoaluminum compound. However, this method also has a problem of creating complicated processes resulting from the addition of a reaction regulator.

Further, U.S. Pat. No. 4,060,468 describes a method of preparing catalytic active species by irradiating UV onto a complex prepared by adding a phenol derivative to W salt or Mo salt compound. But, this unique method of preparing catalytic active species seems to have a limitation when applied to mass-production.

In the meantime, U.S. Pat. No. 5,840,820 describes a method of preparing cyclic olefin polymer, in which Ru carbene complex compound is used as a single catalyst, or a complex preparing by adding organoaluminum halide compound or organic alkyl tin compound by W salt complex compound is used as a catalyst, and in that case $CO_2$ is used as a polymerization solvent. But the polymerization yield according to this method is less than 80% even though the polymerization reaction is continued for a long time (more than 10 hours ) under high pressure (over 1000 psi).

U.S. Pat. No. 6,433,113 describes a method of preparing cyclic olefin polymer by adding α-olefin as a chain transfer agent to the mixture of Mo salt compound and organoaluminum compound. According to this method, the polymerization yield varies significantly with the polymerization conditions (polymerization yield=10~100%).

On the other hand, instead of organoaluminum halide compound, which has been used as one of the major components forming catalytic systems for the production of cyclic olefin polymer, organic alkyl tin compound has been tested. For example, U.S. Pat. No. 4,810,762 describes a method of preparing cyclic olefin polymer by using a complex, as a catalyst, prepared by adding $R_3SnH$ or $Ph_3SnH$ to W salt compound with the substitution of phenol derivatives. U.S. Pat. No. 5,081,208 describes a preparing method of cyclic olefin polymer by using a complex, as a catalyst, prepared by adding $R_3SnH$ compound to the mixture of W salt compound and phenol compound. However, the above two methods have the problem of using an Sn compound, which is known as a harmful substance.

DISCLOSURE OF THE INVENTION

To overcome the above problems, the present inventors have endeavored and completed this invention by confirming that cyclic olefin copolymer can be prepared with high yield without using a reaction speed regulator or a gel inhibitor to control gel formation by using a complex prepared by mixing a W salt compound and an organoaluminum halide as a ROMP catalyst and regulating the compositions of norbornene and cyclic olefin compounds, used as monomers forming the copolymer, as indicated in the Empirical Formula 1.

Thus, it is an object of the present invention to provide a method of preparing cyclic olefin copolymer with high yield but without using a reaction regulator or gel inhibitor, by regulating the ratio of monomers forming a copolymer in order to inhibit gel production.

To achieve the above object, the present invention provides a method of preparing cyclic olefin copolymer with high yield, but without using a reaction speed regulator or gel inhibitor, by using a complex prepared by mixing W salt compound and organoaluminum halide compound as a catalyst and by regulating the compositions of norbornene and cyclic olefin compound forming a copolymer, as indicated in Empirical Formula 1, to control gel production.

(Empirical Formula 1)
Norbornene=30~70 weight %
Cyclic olefin compound=70~30 weight %

At this time, the cyclic olefin compound presented in the above Empirical Formula 1 is one or more compounds selected from a group consisting of dicyclopentadiene and compounds represented by the following Formula1.

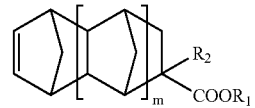
(Formula 1)

Wherein, m is an integer of 0-1, $R_1$ is $C_1$-$C_5$ alkyl and $R_2$ is H or $C_1$-$C_{10}$ alkyl.

The present invention is described in detail hereinafter.

The present invention relates to a method of preparing cyclic olefin copolymer with high yield, in which the compositions of norbornene and cyclic olefin compound forming a copolymer are regulated, as indicated in the Empirical Formula 1, to avoid using a reaction speed regulator or gel inhibitor to control gel production. According to the present invention, when the compositions of norbornene and cyclic olefin compound are regulated as indicated in the Empirical Formula 1, gel production is regulated at less than 1 weight % for the entire monomers.

To perform ROMP of norbornene and cyclic olefin compound, a catalyst used in the present invention was composed of a W salt compound and an organoaluminum halide compound. As a W salt compound, $WCl_6$, $WCl_4$, $WOCl_4$, $W(CO)_6$, $W(OC_6H_5)_6$, $WCl_2(OC_6H_5)_4$, $W(CO)_3(CH_3CN)_3$, and $W(OEt_2)Cl_3$ compound can be used, and in particular $WCl_6$ and $WOCl_4$ compounds are preferred. The preferable dosage of W salt compound is $1\times10^{-5}$~$1\times10^{-3}$ mol per 10 g of a monomer.

As an organoaluminum halide compound, dimethylaluminum chloride, diethylaluminum chloride, dipropylaluminum chloride, diisobutylaluminum chloride, dioctylaluminum chloride, methylaluminum dichloride, ethylaluminum dichloride, propylaluminum dichloride, isobutylaluminum dichloride, octylaluminum dichloride, methylaluminum sesquichloride, ethylaluminum sesquichloride and butylaluminum sesquichloride compounds can be used, and particularly diethylaluminum chloride, diisobutylaluminum chloride, ethylaluminum dichloride, isobutylaluminum dichloride and ethylaluminum sesquichloride compounds are preferred. When alkylaluminum compound ($AlR_3$), which is one of the constituents of the polymerization catalyst of diene compound, is used instead of an organoaluminum halide compound, the yield is significantly lowered, making the processes uneconomical and the molecular weight of the polymer cannot be increased, thereby limiting any improvement of properties.

According to the present invention, a compound which can be applied as a molecular weight regulator is exemplified by 1-butene, 1-pentene, 1-hexene, 1-octene, 2-butene, 2-pentene, 1,4-hexadiene compound and among them, 1-butene, 1-hexene and 1-octene are preferred.

As explained hereinbefore, a W salt compound and an organoaluminum halide compound are mixed to prepare a catalyst for ROMP for the production of cyclic olefin copolymer. At this time, a solvent used for the production of the catalyst has to be a non-reactive, non-polar solvent, and cyclohexane, hexane, benzene, toluene chlorobenzene and o-dichlorobenzene are preferred.

It is preferred to mix the W salt compound and the organoaluminum halide compound at the molar ratio of 1:30~1:100 and more preferable to mix them at the molar ratio of 1:40~1:80. If the molar ratio is out of the above range and the organoaluminum halide compound is used at less than 30 mol to 1 mol of the W salt compound, the yield is lowered. On the contrary if the organoaluminum halide compound is used at more than 100 mol to 1 mol of the W salt compound, the color change of a product might be observed and economic efficiency is reduced.

To prepare a catalyst herein, a W salt compound is first put in a reactor in the presence of nitrogen and then an organoaluminum halide compound is added thereto. At this time, the order in which compounds are added can be different in order to prepare a catalyst.

So, the copolymer of the present invention is prepared by ROMP of cyclic olefin compound using a catalyst prepared as described above. And, the non-polar polymerization solvent used for the polymerization is exemplified by an aliphatic hydrocarbon such as hexane, heptane, octane and isooctane; a cycloaliphatic hydrocarbon such as cyclopentane, methylcyclopentane, cyclohexane, methylcyclohexane and ethylcyclohexane; and an aromatic hydrocarbon such as benzene, toluene, chlorobenzene, o-dichlorobenzene. The preferable ratio of a polymerization solvent to a monomer is 2:1~20:1.

According to the present invention, cyclic olefin copolymer can be prepared with a yield of 80~100% by polymerization for 1~3 hours using a proper catalyst. The polymerized product is finally obtained by precipitating the final reactant in methanol or ethanol containing a small amount of HCl.

As explained hereinbefore, the present invention provides cyclic olefin copolymer with high yield and with the control of gel production.

BEST MODE FOR CARRYING OUT THE INVENTION

Practical and presently preferred embodiments of the present invention are illustrated in the following examples. However, it will be appreciated that those skilled in the art, on consideration of this disclosure, may make modifications and improvements within the spirit and scope of the present invention.

EXAMPLE 1

The ROMP catalyst used herein was $WCl_6$ (1% toluene solution) and diethylaluminum chloride (1 M toluene solution), and the concentration of $WCl_6$ therein was $2.0 \times 10^{-5}$ mol per 10 g of a monomer.

Polymerization was performed as follows: nitrogen was infused into a pressure reactor and then toluene was added as a polymerization solvent and norbornene and dicyclopentadiene (10 g, weight ratio=70:30) were also added as monomers. Then, 1-hexene (20 weight % of monomers) as a molecular weight regulator and $WCl_6$, diethylaluminum chloride compound ([Al]/[W]=60) were serially added, followed by reaction at 60° C. for one hour. The weight ratio of a polymerization solvent to a monomer was 7:1. Upon completion of the reaction, ethanol was added to the reaction product to terminate the reaction.

To measure the gel content in the polymer, the reaction product was left at room temperature for 15 hours after the reaction completed, then 8 g of polymerization solution (polymer content 1 g, yield 100%) was taken and mixed with toluene (60 mL). The mixture was stirred at room temperature for one hour, followed by vacuum filtering using a filter paper (pore size: 5 μm) (in the case that yield was less than 100%, the polymer content was regulated to 1 g by adjusting the amount of the polymerization solution to be taken). The filtered solid was dried and weighed, and the result was divided by the weight of the polymer used for the experiment. As a result, the gel content was indicated as a percentage.

EXAMPLES 2~11

Cyclic olefin copolymer was prepared by the same manner as described above in the Example 1. However as shown in Table 1, the component ratio of catalyst, the kind of W salt catalyst, the component ratio of monomer, the order of adding the catalyst compounds and the amount of 1-hexene were changed.

TABLE 1

|  | Polymerization Catalyst [1] | Molar Ratio | Monomer [2] | W/Monomer (mol/g) | Yield (%) | Gel Content (%) | Amount of 1-hexene (g) |
|---|---|---|---|---|---|---|---|
| Example 1 | $WCl_5$/$AlEt_2Cl$ | 1:60 | Norbornene:DCPD (70:30, weight ratio) | $2.0 \times 10^{-5}/10$ | 100 | 0.11 | 2 |
| Example 2 | $WCl_6$/$AlEt_2Cl$ | 1:60 | Norbornene:DCPD (65:35, weight ratio) | $2.0 \times 10^{-5}/10$ | 100 | 0 | 2 |
| Example 3 | $WCl_5$/$AlEt_2Cl$ | 1:60 | Norbornene:DCPD (60:40, weight ratio) | $2.0 \times 10^{-5}/10$ | 100 | 0 | 2 |

TABLE 1-continued

| | Polymerization Catalyst [1] | Molar Ratio | Monomer [2] | W/Monomer (mol/g) | Yield (%) | Gel Content (%) | Amount of 1-hexene (g) |
|---|---|---|---|---|---|---|---|
| Example 4 | $WOCl_4/AlEt_2Cl$ | 1:80 | Norbornene:DCPD (60:40, weight ratio) | $2.0 \times 10^{-5}/10$ | 100 | 0 | 2 |
| Example 5 | $WCl_6/AlEt_2Cl$ | 1:60 | Norbornene:DCPD (50:50, weight ratio) | $2.0 \times 10^{-5}/10$ | 100 | 0 | 2 |
| Example 6 | $AlEt_2Cl/WCl_6$ | 30:1 | Norbornene:DCPD (50:50, weight ratio) | $1.2 \times 10^{-4}/60$ | 95.8 | 0 | 3 |
| Example 7 | $AlEt_2Cl/WCl_6$ | 30:1 | Norbornene:DCPD (50:50, weight ratio) | $2.0 \times 10^{-4}/100$ | 100 | 0 | 10 |
| Example 8 | $AlEt_2Cl/WCl_6$ | 30:1 | Norbornene:DCPD (50:50, weight ratio) | $2.0 \times 10^{-4}/100$ | 100 | 0 | 20 |
| Example 9 | $WOCl_4/AlEt_2Cl$ | 1:80 | Norbornene:DCPD (50:50, weight ratio) | $2.0 \times 10^{-5}/10$ | 100 | 0 | 2 |
| Example 10 | $WCl_6/AlEt_2Cl$ | 1:80 | Norbornene:DCPD (40:60, weight ratio) | $2.4 \times 10^{-5}/10$ | 100 | 0 | 2 |
| Example 11 | $WCl_6/AlEt_2Cl$ | 1:80 | Norbornene:DCPD (30:70, weight ratio) | $2.4 \times 10^{-5}/10$ | 100 | 0.91 | 2 |

[1] Order of adding components comprising polymerization catalyst;
[2] DCPD = Dicyclopentadiene

EXAMPLES 12~19

Cyclic olefin copolymer was prepared by the same manner as described in Example 1. But different monomers were used for copolymerization, as shown in Tables 2.

Comparative Examples 1~6

Cyclic olefin copolymer was prepared by the same manner as described in Example 1, but the composition of the monomer was adjusted differently from that shown in Empirical Formula 1, followed by polymerization. The results are shown in Table 3.

TABLE 2

| | Polymerization Catalyst [1] | Molar Ratio | Monomer [2] | W/Monomer (mol/g) | Yield (%) | Gel Content (%) | Amount of 1-hexene (g) |
|---|---|---|---|---|---|---|---|
| Example 12 | $WCl_6/AlEt_2Cl$ | 1:80 | Norbornene:MEN (70:30, weight ratio) | $3.0 \times 10^{-5}/10$ | 92.1 | 0 | 2 |
| Example 13 | $WCl_6/AlEt_2Cl$ | 1:80 | Norbornene:MEN (50:50, weight ratio) | $4.0 \times 10^{-5}/10$ | 93.6 | 0 | 2 |
| Example 14 | $WCl_6/AlEt_2Cl$ | 1:100 | Norbornene:MEN (30:70, weight ratio) | $5.0 \times 10^{-5}/10$ | 86.3 | 0 | 2 |
| Example 15 | $WCl_6/AlEt_2Cl$ | 1:80 | Norbornene:MMN (50:50, weight ratio) | $3.0 \times 10^{-5}/10$ | 88.3 | 0 | 2 |
| Example 16 | $WCl_6/AlEt_2Cl$ | 1:80 | Norbornene:MMN (50:50, weight ratio) | $3.0 \times 10^{-5}/10$ | 86.5 | 0 | 0 |
| Example 17 | $WCl_6/AlEt_2Cl$ | 1:100 | Norbornene:MMN (30:70, weight ratio) | $4.0 \times 10^{-5}/10$ | 83.2 | 0 | 2 |
| Example 18 | $WCl_6/AlEt_2Cl$ | 1:80 | Norbornene:DCPD:MMN (50:40:10, weight ratio) | $4.0 \times 10^{-5}/10$ | 94.9 | 0.8 | 2 |
| Example 19 | $WCl_6/AlEt_2Cl$ | 1:80 | Norbornene:DCPD:MMN (30:35:35, weight ratio) | $5.0 \times 10^{-5}/10$ | 97.2 | 0 | 2 |

[1] Adding order of components comprising polymerization catalyst;
[2] MEN = 5-methylester-2-norbornene; MMN = 5-methyl-5'-methylester-2-norbornene; DCPD = Dicyclopentadiene

TABLE 3

| | Polymerization Catalyst [1] | Molar Ratio | Monomer [2] | W/monomer (mol/g) | Yield (%) | Gel Content (%) |
|---|---|---|---|---|---|---|
| Comparative Example 1 | $WCl_6/AlEt_2Cl$ | 1:60 | Norbornene:DCPD (9:1, weight ratio) | $2.0 \times 10^{-5}/10$ | 100 | 29.1 |
| Comparative Example 2 | $WCl_6/AlEt_2Cl$ | 1:80 | Norbornene:DCPD (2:8, weight ratio) | $2.4 \times 10^{-5}/10$ | 100 | 50.1 |
| Comparative Example 3 | $WCl_6/AlEt_2Cl$ | 1:80 | Norbornene:MMN (8:2, weight ratio) | $3.0 \times 10^{-5}/10$ | 94.4 | 24.9 |

TABLE 3-continued

|  | Polymerization Catalyst [1] | Molar Ratio | Monomer [2] | W/monomer (mol/g) | Yield (%) | Gel Content (%) |
|---|---|---|---|---|---|---|
| Comparative Example 4 | WCl$_6$/AlEt$_2$Cl | 1:80 | Norbornene:DCPD:MMN (8:1:1, weight ratio) | 3.0 × 10$^{-4}$/10 | 98.6 | 28.9 |
| Comparative Example 5 | WCl$_6$/AlEt$_2$Cl | 1:100 | Norbornene:DCPD:MEN (2:6:2, weight ratio) | 5.0 × 10$^{-5}$/10 | 100 | 8.6 |
| Comparative Example 6 | WCl$_6$/AlEt$_2$Cl | 1:100 | Norbornene:DCPD:MMN (2:7:1, weight ratio) | 5.0 × 10$^{-5}$/10 | 99.8 | 50.8 |

[1] Order of adding components comprising polymerization catalyst;
[2] DCPD = Dicyclopentadiene; MMN = 5-methyl-5'-methylester-2-norbornene; MEN = 5-methylester-2-norbornene The results shown in Table 1~3 indicate that when the composition of monomer is as shown in Empirical Formula 1, gel formation is precisely inhibited during the production of a copolymer using norbornene and cyclic olefin compound as monomers. However, when the composition of the monomer is out of the range shown in Empirical Formula 1, significant gel production was observed as shown in Table 3.

EXPERIMENTAL EXAMPLE 1

Hydrogenation of cyclic olefin copolymer prepared in the above Example 3 was performed. Then, hydrogenation rate and the molecular weight of the prepared polymer were measured. The results are shown in Table 4.

Hydrogenation was induced as follows: serially added to a 1 L high-pressure reactor were toluene (weight ratio of polymerization solvent to copolymer is 10.5:1) as a reaction solvent, copolymer, and 5 mol % Pd/carbon (10 Wt % for the weight of copolymer), followed by reaction at 150° C. for 150 minutes under 600 psi of hydrogen pressure. A small amount of an antioxidant was added to the reaction product. The produced product was precipitated in MeOH containing HCl to obtain the final polymer. Hydrogenation rate was calculated by using $^1$H—NMR.

EXPERIMENTAL EXAMPLES 2~4

Hydrogenation of cyclic olefin copolymer was performed by the same manner as described in Experimental Example 1. Then, hydrogenation rate and the molecular weight of the prepared polymer were measured. The results are shown in Table 4.

TABLE 4

|  | Polymer | Hydrogenation Rate (%) | M$_w$ | MWD |
|---|---|---|---|---|
| Experimental Example 1 | Example 3 | 99.9 | 31,000 | 1.55 |
| Experimental Example 2 | Example 6 | 99.9 | 225,000 | 2.50 |
| Experimental Example 3 | Example 7 | 99.5 | 115,000 | 1.75 |
| Experimental Example 4 | Example 8 | 99.9 | 89,500 | 1.57 |

In Table 4, M$_W$ indicates the weight average molecular weight of the prepared copolymer and MWD indicates molecular weight distribution.

EXPERIMENTAL EXAMPLE 5

Hydrogenation of cyclic olefin copolymer prepared in the above Example 14 was performed. Then, hydrogenation rate and the molecular weight of the prepared polymer were measured. The results are shown in Table 5.

Hydrogenation was induced as follows: serially added to a 100 mL three way reactor were toluene (100 mL) as a reaction solvent, 0.5 g of cyclic olefin copolymer as a hydrogenation reactant and p-toluenesulfonhydrazide (20 mmol, 3.75 g), followed by reflux for 7 hours. Upon completion of the reaction, the reaction solution was filtered to eliminate non-reacted p-toluenesulfonhydrazide. A small amount of an antioxidant was added to the filtrate. The reaction solution was added to methanol containing HCl to obtain the final polymer. Hydrogenation rate was calculated by using $^1$H—NMR.

EXPERIMENTAL EXAMPLES 6~8

Hydrogenation of cyclic olefin polymer was performed by the same manner as described in Experimental Example 5. Then, hydrogenation rate and the molecular weight of the prepared polymer were measured. The results are shown in Table 5.

TABLE 5

|  | Polymer | Hydrogenation Rate (%) | M$_w$ | MWD |
|---|---|---|---|---|
| Experimental Example 5 | Example 14 | 99.9 | 34,400 | 2.50 |
| Experimental Example 6 | Example 17 | 99.9 | 38,600 | 2.64 |
| Experimental Example 7 | Comparative Example 2 | 92.5 | 39,700 | 2.46 |
| Experimental Example 8 | Comparative Example 3 | 94.8 | 122,000 | 3.92 |

In Table 5, M$_W$ indicates the weight average molecular weight of the prepared copolymer and MWD indicates molecular weight distribution.

From the results shown in Table 4 and Table 5, it has been confirmed that a polymer having controlled gel content provides high hydrogenation rate, which is more than 99% (Experimental Examples 1~6) but a polymer having uncontrolled gel content is difficult to provide 95% or more hydrogenation rate (Experimental Examples 7~8). If hydrogenation does not proceed efficiently, a polymer product has a high level of unsaturated double bonds, which is relatively unstable compared with a polymer having less double bonds, and has a possibility of color change or degradation under such environmental conditions as high temperature, pressure or various additives. Therefore, the properties and transparency of a prepared polymer are crucially affected, drawing limitation in applicable fields.

INDUSTRIAL APPLICABILITY

As explained hereinbefore, according to the present invention cyclic olefin copolymer can be prepared with high yield by using a complex prepared by the mixture of W salt compound and organoaluminum halide compound as a catalyst, and a method of controlling gel formation can be easily accomplished by regulating the composition of cyclic olefin compound forming a copolymer as indicated in Empirical Formula 1 even without using an additional reaction speed regulator or gel inhibitor.

Those skilled in the art will appreciate that the conceptions and specific embodiments disclosed in the foregoing description may be readily utilized as a basis for modifying or designing other embodiments for carrying out the same purposes of the present invention. Those skilled in the art will also appreciate that such equivalent embodiments do not depart from the spirit and scope of the invention as set forth in the appended claims.

The invention claimed is:

1. A method of preparing cyclic olefin copolymer by ROMP in the presence of a non-polar solvent, a molecular weight regulator compound and a catalyst, in which the catalyst is a complex prepared by mixing a W salt compound and an organoaluminum halide compound and the composition of cyclic olefin compound forming a copolymer is regulated as indicated in Empirical Formula 1 to control gel content, as follows:

(Empirical Formula 1)
Norbornene=30~70 weight %,
Cyclic olefin compound=70~30 weight %;
wherein the cyclic olefin compound presented in Empirical Formula 1 is one or more compounds selected from a group consisting of dicyclopentadiene and other compounds represented by the following Formula 1:

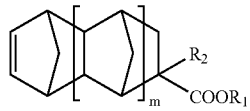

(Formula 1)

wherein, m is an integer of 0-1, $R_1$ is $C_1$-$C_5$ alkyl and $R_2$ is H or $C_1$-$C_{10}$ alkyl; and wherein the organoaluminum halide compound is one or more compounds selected from a group consisting of dimethylaluminum chloride, diethylaluminum chloride, dipropylaluminum chloride, diisobutylaluminum chloride, dioctylaluminum chloride, methylaluminum dichloride, ethylaluminum dichloride, propylaluminum dichloride, isobutylaluminum dichloride, octylaluminum dichloride, methylaluminum sesquichloride, ethylaluminum sesquichloride and butylaluminum sesquichloride compound.

2. The method of preparing cyclic olefin copolymer according to claim 1, wherein the W salt compound is one of $WCl_6$, $WCl_4$, $WOCl_4$, $W(CO)_6$, $W(OC_6H_5)_6$, $WCl_2(OC_6H_5)_4$, $W(CO)_3(CH_3CN)_3$ or $W(OEt_2)Cl_3$ compound.

3. The method of preparing cyclic olefin copolymer according to claim 1, wherein the W salt compound is $WCl_6$ or $WOCl_4$ compound.

4. The method of preparing cyclic olefin copolymer according to claim 1, wherein the content of the W salt compound is $1\times10^{-5}$~$1\times10^{-3}$ mol per 10 g of the cyclic olefin compound.

5. The method of preparing cyclic olefin copolymer according to claim 1, wherein the organoaluminum halide compound is one or more compounds selected from a group consisting of diethylaluminum chloride, diisobutylaluminum chloride, ethylaluminum dichloride, isobutylaluminum dichloride and ethylaluminum sesquichloride compound.

6. The method of preparing cyclic olefin copolymer according to claim 1, wherein the molar ratio of the W salt compound to the organoaluminum halide compound is 1:30~1:100.

7. The method of preparing cyclic olefin copolymer according to claim 1, wherein the molar ratio of the W salt compound to the organoaluminum halide compound is 1:40~1:80.

8. The method of preparing cyclic olefin copolymer according to claim 1, wherein the molecular weight regulator is one or more compounds selected from a group consisting of 1-butene, 1-pentene, 1-hexene, 1-octene, 2-butene, 2-pentene and 1,4-hexadiene compound.

9. The method of preparing cyclic olefin copolymer according to claim 1, wherein the non-polar solvent is one or more compounds selected from a group consisting of hexane, heptane, octane and isooctane; cyclopentane, methylcyclopentane, cyclohexane, methylcyclohexane and ethylcyclohexane; and benzene, toluene, chlorobenzene, and o-dichlorobenzene.

10. The method of preparing cyclic olefin copolymer according to claim 2, wherein the organoaluminum halide compound is one or more compounds selected from a group consisting of diethylaluminum chloride, diisobutylaluminum chloride, ethylaluminum dichloride, isobutylaluminum dichloride and ethylaluminum sesquichloride compound.

11. The method of preparing cyclic olefin copolymer according to claim 3, wherein the organoaluminum halide compound is one or more compounds selected from a group consisting of diethylaluminum chloride, diisobutylaluminum chloride, ethylaluminum dichloride, isobutylaluminum dichloride and ethylaluminum sesquichloride compound.

12. The method of preparing cyclic olefin copolymer according to claim 4, wherein the organoaluminum halide compound is one or more compounds selected from a group consisting of diethylaluminum chloride, diisobutylaluminum chloride, ethylaluminum dichloride, isobutylaluminum dichloride and ethylaluminum sesquichioride compound.

* * * * *